(12) United States Patent
Yamamoto

(10) Patent No.: US 8,871,405 B2
(45) Date of Patent: Oct. 28, 2014

(54) POLYMER ELECTROLYTE FUEL CELL STACK

(75) Inventor: Yoko Yamamoto, Osaka (JP)

(73) Assignee: Panasonic Corporation, Osaka (JP)

( * ) Notice: Subject to any disclaimer, the term of this patent is extended or adjusted under 35 U.S.C. 154(b) by 423 days.

(21) Appl. No.: 13/147,629

(22) PCT Filed: Feb. 3, 2010

(86) PCT No.: PCT/JP2010/000629
§ 371 (c)(1),
(2), (4) Date: Aug. 3, 2011

(87) PCT Pub. No.: WO2010/090003
PCT Pub. Date: Aug. 12, 2010

(65) Prior Publication Data
US 2011/0294030 A1   Dec. 1, 2011

(30) Foreign Application Priority Data
Feb. 5, 2009   (JP) ................................ 2009-024544

(51) Int. Cl.
*H01M 2/20* (2006.01)
*H01M 8/24* (2006.01)
*H01M 8/10* (2006.01)

(52) U.S. Cl.
CPC ................ *H01M 8/248* (2013.01); *Y02E 60/50* (2013.01); *H01M 8/2475* (2013.01); *H01M 8/247* (2013.01); *H01M 2008/1095* (2013.01)
USPC ............................ 429/467; 429/452; 429/470

(58) Field of Classification Search
CPC ...................................................... H01M 8/248
USPC .......................................................... 429/470
See application file for complete search history.

(56) References Cited

U.S. PATENT DOCUMENTS

| | | | |
|---|---|---|---|
| 6,210,823 B1 | 4/2001 | Hatoh et al. | |
| 2004/0247995 A1 | 12/2004 | Devitt | |
| 2005/0042493 A1 | 2/2005 | Fujita et al. | |
| 2005/0255342 A1 | 11/2005 | Lee et al. | |

(Continued)

FOREIGN PATENT DOCUMENTS

| CN | 1245981 | 3/2000 |
|---|---|---|
| CN | 1697226 | 11/2005 |

(Continued)

OTHER PUBLICATIONS

Supplemental European Search Report, issued Jun. 21, 2012 in EP application 10 73 8344.0.

(Continued)

*Primary Examiner* — Ula C Ruddock
*Assistant Examiner* — Archer Dudley
(74) *Attorney, Agent, or Firm* — Wenderoth, Lind & Ponack L.L.P.

(57) ABSTRACT

When assembly is carried out by clamping a stacked product made up of a plurality of unit cell modules, paired end plates respectively disposed on both the sides thereof and the like by a plurality of fastening members, first coupling portions of one end portion of each of such plurality of fastening members and second coupling portions of the other end portions are combined to each other, and coupled with one pin member. Thus, a plurality of such fastening members are coupled.

15 Claims, 14 Drawing Sheets

(56) References Cited

U.S. PATENT DOCUMENTS

| | | | |
|---|---|---|---|
| 2006/0046127 A1 | 3/2006 | Ishizuka et al. | |
| 2006/0093890 A1 | 5/2006 | Steinbroner | |
| 2007/0052390 A1* | 3/2007 | Kim et al. ................ | 320/116 |
| 2008/0182152 A1* | 7/2008 | Erikstrup ................... | 429/34 |
| 2008/0305380 A1 | 12/2008 | Andreas-Schott et al. | |
| 2009/0297920 A1* | 12/2009 | Yoshitomi et al. .......... | 429/34 |
| 2010/0159345 A1 | 6/2010 | Shibata et al. | |

FOREIGN PATENT DOCUMENTS

| | | | | |
|---|---|---|---|---|
| CN | 102171881 | | 8/2011 | |
| EP | 1 760 806 | | 3/2007 | |
| EP | 2 280 442 | | 2/2011 | |
| EP | 2 360 768 | | 8/2011 | |
| JP | 2000-67902 | | 3/2000 | |
| JP | 2000-067903 | | 3/2000 | |
| JP | 2000067902 | * | 3/2000 | ............. H01M 8/24 |
| JP | 2001-135344 | | 5/2001 | |
| JP | 2005-71765 | | 3/2005 | |
| JP | 2005-142145 | | 6/2005 | |
| JP | 2005-276484 | | 10/2005 | |
| JP | 2005-327718 | | 11/2005 | |
| JP | 2007-141716 | | 6/2007 | |
| JP | 2007-280890 | | 10/2007 | |
| JP | 2008-124033 | | 5/2008 | |

OTHER PUBLICATIONS

International Search Report issued May 11, 2010 in International (PCT) Application No. PCT/JP2010/000629.

Chinese Office Action, issued May 27, 2013 in CN Application 201080004705.0, (with partial English translation).

International Preliminary Report on Patentability and Written Opinion of the International Searching Authority (in English), issued Sep. 22, 2011 in International (PCT) Application No. PCT/JP2010/000629.

* cited by examiner

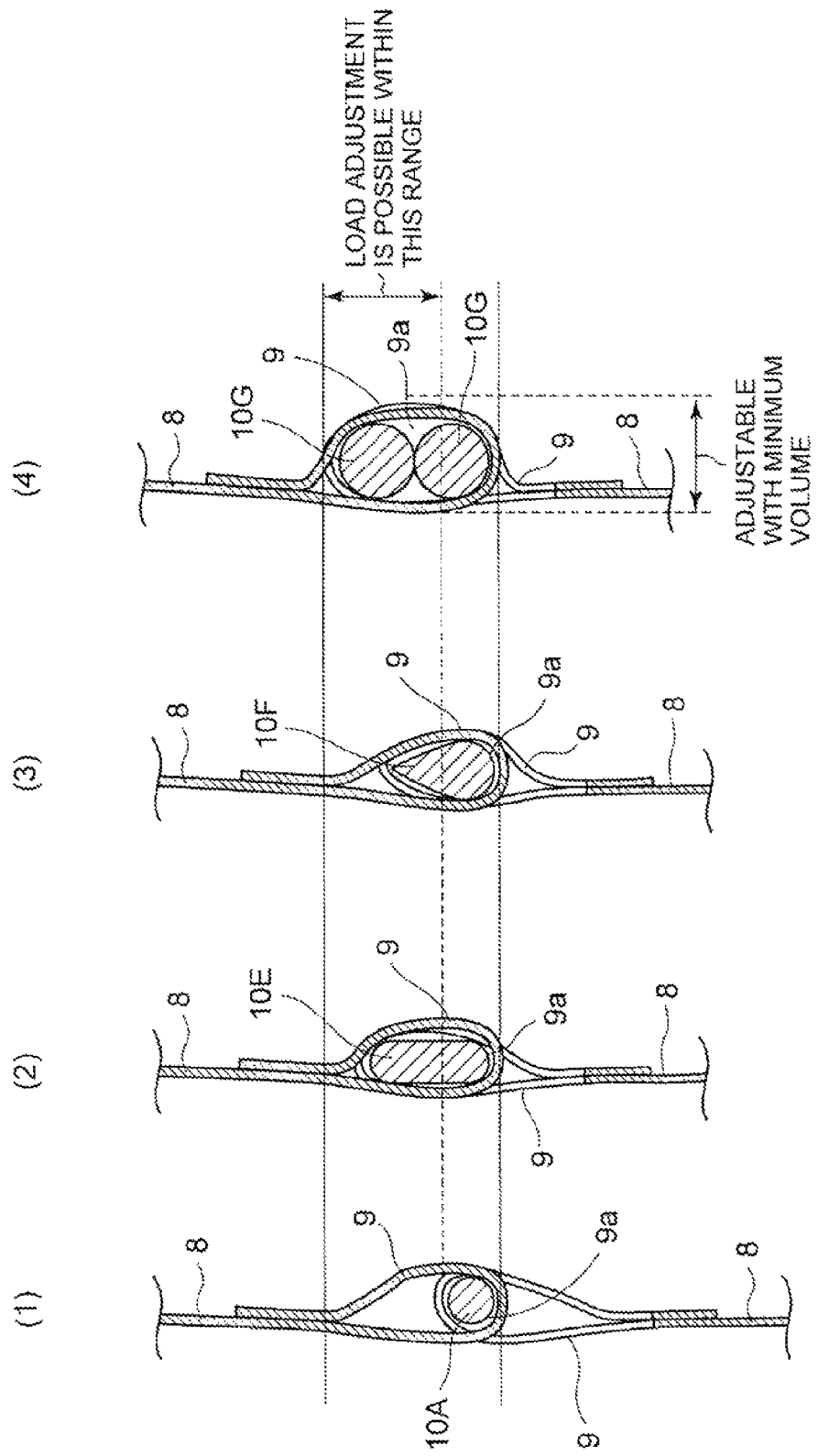

POLYMER ELECTROLYTE FUEL CELL STACK

TECHNICAL FIELD

The present invention relates to a solid polymer electrolyte fuel cell stack of an ambient temperature operating type used for a portable power supply, an electric vehicle-use power supply, a household cogeneration system, or the like.

BACKGROUND ART

A fuel cell using polyelectrolyte allows a hydrogen-containing fuel gas and an oxygen-containing oxidant gas such as air to electrochemically react with each other, such that electric power and heat are produced at the same time. The fuel cell is basically structured with a polymer electrolyte membrane that selectively transports hydrogen ions, and paired electrodes formed on both the surfaces of the polymer electrolyte membrane, i.e., an anode and a cathode, respectively. The electrodes each have a catalyst layer whose principal component is carbon powder bearing platinum metal catalyst and which is formed on the front surface of the polymer electrolyte membrane, and a gas diffusion layer which has combined features of air permeability and electronic conductivity and which is disposed on the outer surface of the catalyst layer. Such an assembly made up of the polymer electrolyte membrane and the electrodes (including the gas diffusion layer) integrally joined and assembled is referred to as an electrolyte membrane electrode assembly (hereinafter referred to as the "MEA").

Further, on the opposite sides of the MEA, electrically conductive separators for mechanically clamping the MEA to fix the same, and for establishing electrical connection in series between the MEA and adjacent MEA, are disposed, respectively. In each separator, at the portion being brought into contact with the MEA, gas flow channels for supplying corresponding electrode with a fuel gas or a reactant gas such as an oxidant gas, and to carry away generated water or excess gas are formed. Though the gas flow channels can be provided separately from the separators, such grooves are generally formed on the front surfaces of the separators to serve as the gas flow channels. It is to be noted that, such a structure body in which the MEAs are clamped between the paired separators is referred to as the "unit cell module".

Supply of the reactant gas to the gas flow channels formed between the separators and the MEA and discharge of the reactant gas and generated water from the gas flow channels are each carried out in the following manner: through holes called manifold holes are provided at the edge portion of at least one of the paired separators, to establish communication between the inlet/outlet port of each of the gas flow channels and each of the manifold holes, and the reactant gas is distributed to the gas flow channels from the manifold holes.

Further, in order to prevent external leakage of the fuel gas or the oxidant gas supplied to the gas flow channels, or to prevent mixture of the gases of two types, gas sealing members or gaskets are disposed as sealing members between the paired separators, at the places where the electrodes are formed in the MEA, that is, around the external circumference of the power generation areas. The gas sealing members or the gaskets also seal the circumference of each of the manifold holes.

Because the fuel cell generates heat while driving, the cell must be cooled by coolant or the like, in order to maintain the cell at an excellent temperature state. Normally, a cooling portion for allowing the coolant to flow is provided every one to three cells. The general structure of a stacked battery (fuel cell stack) is as follows: the MEA and the separators, and the cooling portion are alternately stacked by ten to two hundred cells; thereafter, an end plate is disposed at each of the end portions of the whole cells having a current collecting plate and an insulating plate interposed therebetween, such that the whole cells are clamped between such paired end plates and fixed from both the ends through the use of fastening bolts (rods) or the like. As to the fastening method, the general method is to fasten with fastening bolts which are inserted into through holes formed at the edge portions of the separators; or to fasten up the entire stacked battery with a metal belt on the end plates.

With the stacked battery employing such a fastening method, it is regarded that it is important to fasten the unit cell module with a fastening force which is uniform in-plane (i.e., within a plane perpendicular to the stacked direction). This is because such a uniform fastening force makes it possible to prevent leakage of air, hydrogen, coolant and the like, and to prevent damage to the unit cell module. Further, consequently, it makes it possible to improve power generation efficiency, and to extend battery service life. In connection with such a fastening method, as shown in FIG. 12, Patent Document 1 proposes a method of fastening with bands 901 under a prescribed residual stress, from the viewpoint of the in-plane uniformization, minimization of bending load, and an improvement in air-tightness.

Similarly, Patent Document 3 discloses a method of fastening the entire stack with one band or two bands. Patent Document 4 discloses a method of fastening with a multitude of bands at both the side surfaces of the stack.

Further, as shown in FIG. 13, Patent Document 2 proposes a band fastening method in which fastening is carried out by metal bands 101 and auxiliary plates 102, and disk springs and bolts 103, so as to achieve a reduction in size and weight of the stack, which is highly reliable withstanding shock and vibration.

Further, Patent Documents 5 and 7 disclose fastening of the stack with bolts, in which a band and auxiliary plates are disposed so as to surround end plates at both the ends of the stack.

Still further, Patent Document 6 discloses fastening of the stack, in which six plate members disposed at respective planes of the stack are engaged with one another at their sides.

PRIOR ART DOCUMENTS

Patent Documents

Patent Document 1: Japanese Unexamined Patent Publication No. 2001-135344 (page 5, FIG. 4)
Patent Document 2: Japanese Unexamined Patent Publication No. 2005-142145 (page 10, FIG. 3)
Patent Document 3: United States Patent
Patent Document 4: United States Patent Application Publication No. 2008/0305380
Patent Document 5: U.S. Pat. No. 6,210,823
Patent Document 6: Japanese Unexamined Patent Publication No. 2005-276,484
Patent Document 7: Japanese Unexamined Patent Publication No. 2000-67,903

SUMMARY OF THE INVENTION

Issues to be Resolved by the Invention

Meanwhile, in a case where a stacked product structured by stacking modules each made up of a plurality of unit cells in one direction is fastened up with a band, the fastening load to the stacked product is determined by the thickness of the stacked product and the length of the band, and an appropriate fastening load cannot be applied to the entire stack. Here, since variations occur in thickness of the stacked product and in length of the band, an appropriate fastening load must be applied to the stacked product in accordance with variations in, thickness of the stacked product, in order to allow the performance of the stack to be exhibited. Even in the methods employed in Patent Documents 1, 3, and 4, since fastening can only be carried out under residual stress previously loaded on the bands, they suffer from excessive or insufficient fastening load upon variations in thickness of the stacked product. Similarly, Patent Document 6 is only capable of achieving fastening under the residual stress which is loaded previously when coupling the plate members to each other, and hence it suffers from excessive or insufficient fastening load upon variations in thickness of the stacked product.

Further, though the methods employed in Patent Documents 2, 5, and 7 are capable of adjusting the load through the use of the bolts or the disk springs addressing the variations in thickness of the stacked product, they suffer from an issue of an increase in volume of the stack, which is attributed to the bolts for the adjustment.

Accordingly, an object of the present invention is to solve the aforementioned issues, and to provide, in a polymer electrolyte fuel cell, a polymer electrolyte fuel cell stack that can achieve a reduction in size of a stack, that can adjust a fastening load with ease in accordance with variations in the stacked product, and that can improve power generation performance and durability.

Means for Resolving the Issues

In order to provide the object stated above, the present invention is structured as follows.

According to a first aspect of the present invention, there is provided a polymer electrolyte fuel cell stack, being a fuel cell stack storing a stacked product in paired O-curved plate-like fastening members, the stacked product being obtained by stacking a plurality of unit cell modules in which paired electrode layers respectively formed on opposite surfaces of a polymer electrolyte membrane are clamped between paired separators, wherein paired end plates are respectively disposed at opposite ends of the stacked product, the paired fastening members each being structured with: a base plate that can be brought into close contact with an outer surface of a flat portion of the end plate and that is formed on the outer surface of the end plate in a stacked direction of the stacked product; and side plates continuously extending in both sideways of the stacked product of the base plate, the paired fastening members each having at least one first coupling portion disposed at an edge portion of the side plate in the stacked direction of the stacked product, and a plurality of second coupling portions disposed at an edge portion of an other end portion of the side plate in the stacked direction of the stacked product, and in a state where the first coupling portion formed at the one fastening member and the plurality of second coupling portions formed at the other fastening member are combined, the first coupling portion and the second coupling portions are coupled to each other in the stacked direction of the stacked product by one pin member, so as to couple the paired fastening members to each other.

According to a second aspect of the present invention, there is provided the polymer electrolyte fuel cell stack according to the first aspect, wherein the pin member is passed through at a portion where a through hole of the first coupling portion of each one end portion and a through hole of each of the plurality of second coupling portions of the other end portion overlap each other, such that the pin member couples the one end portion and the other end portion to each other between the fastening members.

According to a third aspect of the present invention, there is provided the polymer electrolyte fuel cell stack according to the second aspect, wherein each of the coupling portions is structured with a belt-like member having its opposite ends fixed to each other, to form a hole for allowing the pin member to pass therethrough.

According to a fourth aspect of the present invention, there is provided the polymer electrolyte fuel cell stack according to any one of the first to third aspects, wherein the paired fastening members are identical to each other in a disposition position of the coupling portion at the one end portion, and the paired fastening members are identical to each other in disposition positions of the coupling portions at the other end portion, the disposition positions of the coupling portions at the other end portion alternating with the disposition position of the coupling portion at the one end portion.

According to a fifth aspect of the present invention, there is provided the polymer electrolyte fuel cell stack according to any one of the first to fourth aspects, wherein a shape of a cross-section of the pin member taken perpendicularly to a longitudinal direction is circular or oval.

According to a sixth aspect of the present invention, there is provided the polymer electrolyte fuel cell stack according to any one of the first to fourth aspects, wherein per coupling place for the fastening members, a plurality of the pin members are used.

According to a seventh aspect of the present invention, there is provided the polymer electrolyte fuel cell stack according to any one of the first to fifth aspects, wherein one coupling place for the fastening members is provided, and fastening is established using the pin member one in number.

According to an eighth aspect of the present invention, there is provided the polymer electrolyte fuel cell stack according to any one of the first to fifth aspects, wherein three coupling places for the fastening members are provided, and fastening is established using the pin member one in number in each of the coupling places.

With such a structure, an appropriate fastening load can be applied to any fuel cell stack with the smallest possible number of components. Thus, it becomes possible to reduce the stack in size dispensing with redundant components such as fastening load adjustment mechanism, and without incurring an increase in volume.

Effects of the Invention

As described above, according to the polymer electrolyte fuel cell stack of the present invention, it becomes possible to apply an appropriate and uniform load to the stack with a simple structure. Further, it becomes possible to change and adjust the fastening load with ease just by replacing with another pin member differing in dimension or shape or number of pieces in terms of the direction perpendicular to the longitudinal direction of the pin member(s). Accordingly, even there exist variations in thickness of the stacked product, for example, just by preparing a pin member(s) differing in dimension or shape or number of pieces in terms of the direction perpendicular to the longitudinal direction of the pin member(s), and replacing the pin member(s) thereby, the effect of easier adjustment of the fastening load and application of an appropriate and uniform, i.e., even, load to the stack can be exhibited. As a result, application of such a uniform load to the stack brings about the additional effect of improved power generation performance and durability of the stack. Further, since coupling is established with a simple structure made up of the coupling portions and the pin members, any space for providing a load adjustment mechanism of a complicated structure or the like can be dispensed with. Additionally, fastening of the stack can easily be carried out, and excellent assemblability can be achieved.

BRIEF DESCRIPTION OF DRAWINGS

These and other aspects and features of the present invention will become clear from the following description taken in conjunction with the preferred embodiments thereof with reference to the accompanying drawings, in which:

FIG. 8 is an enlarged cross-sectional plan view of the band coupling portion according to the first to third working examples of the embodiment (in which (1) in FIG. 8 shows a case where the pin having a circular cross section according to the first working example is used; (2) in FIG. 8 shows a case where a pin having an oval cross section is used in the second working example of the embodiment; (3) in FIG. 8 shows a case where a pin having a teardrop cross section is used in the second working example; and (4) in FIG. 8 shows a case where two pins are used in the third working example);

DESCRIPTION OF EMBODIMENTS

In the following, with reference to the drawings, a description will be given of an embodiment for carrying out the present invention.

Figure 1:
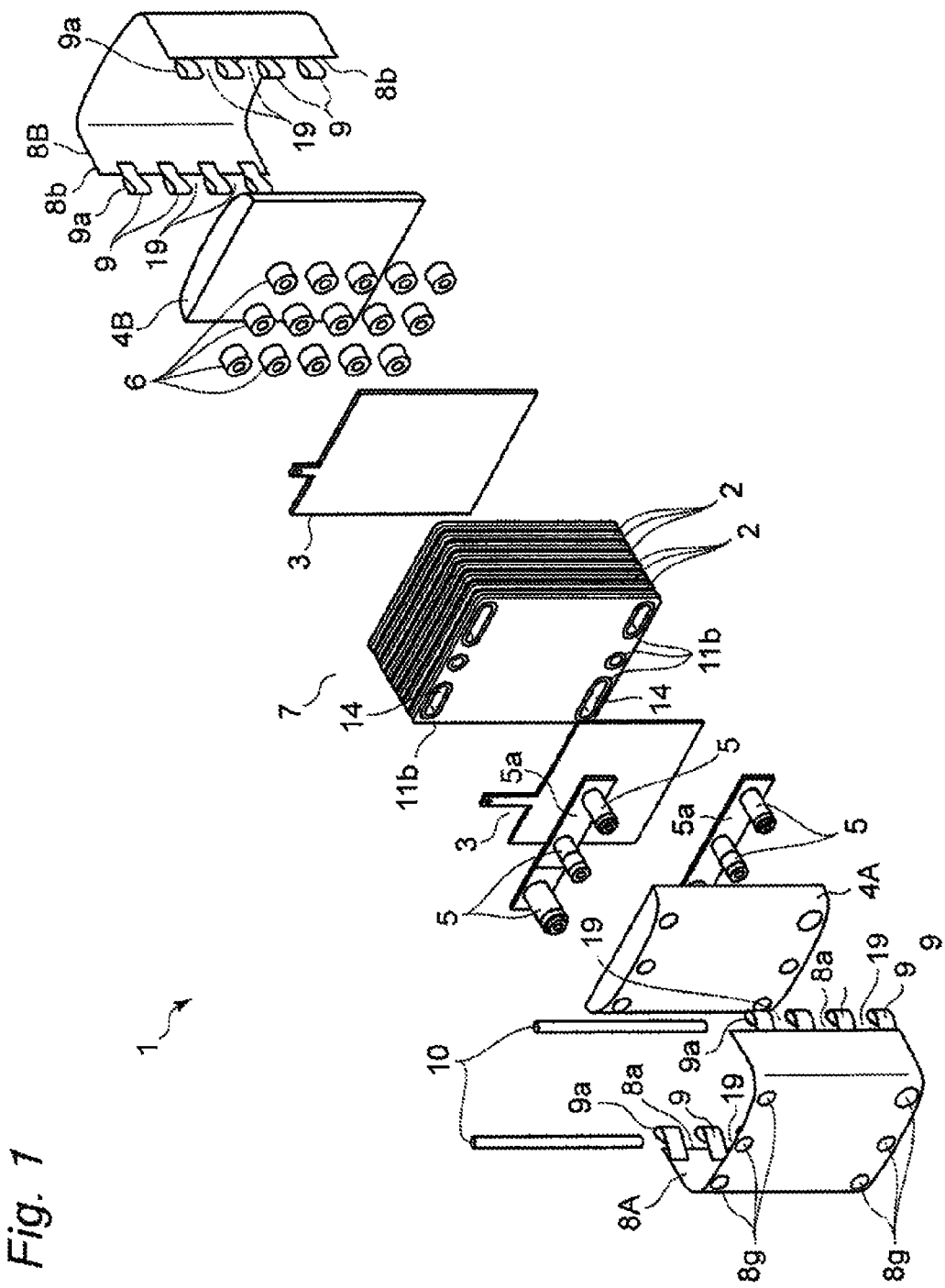
FIG. 1 is a perspective view showing the exploded structure of a fuel cell stack being one example of a polymer electrolyte fuel cell according to one embodiment for carrying out the present invention.

FIG. 1 is a perspective view showing the exploded structure of a fuel cell stack 1 being one example of a solid polymer electrolyte fuel cell according to one embodiment of the present invention. As shown in FIG. 1, at the center portion of the fuel cell stack 1, a plurality of (e.g., some dozens of) unit cell modules (cells) 2 are stacked, to structure a cell-stacked product 7. At the outermost layer at one end of the cell-stacked product 7, a current collecting plate 3, a plurality of pipes 5, a front end plate 4A, and a band 8A as one example of a fastening member are disposed. At the outermost layer at the other end of the cell-stacked product 7, a current collecting plate 3, a multitude of internal springs 6 as one example of an elastic body, a rear end plate 4B, and a band 8B as one example of the fastening member are disposed. Then, from the outer side of the paired end plates 4A and 4B, the entire fastening target members (fastened members), such as the current collecting plates 3, the cell-stacked product 7 and the like, are fastened up by paired bands 8A and 8B made of metal or the like, to structure the fuel cell stack 1. One example of the bands 8A and 8B is those made of stainless steel (more specifically, stainless steel plate members each having a thickness of about 0.5 mm).

Figure 2:
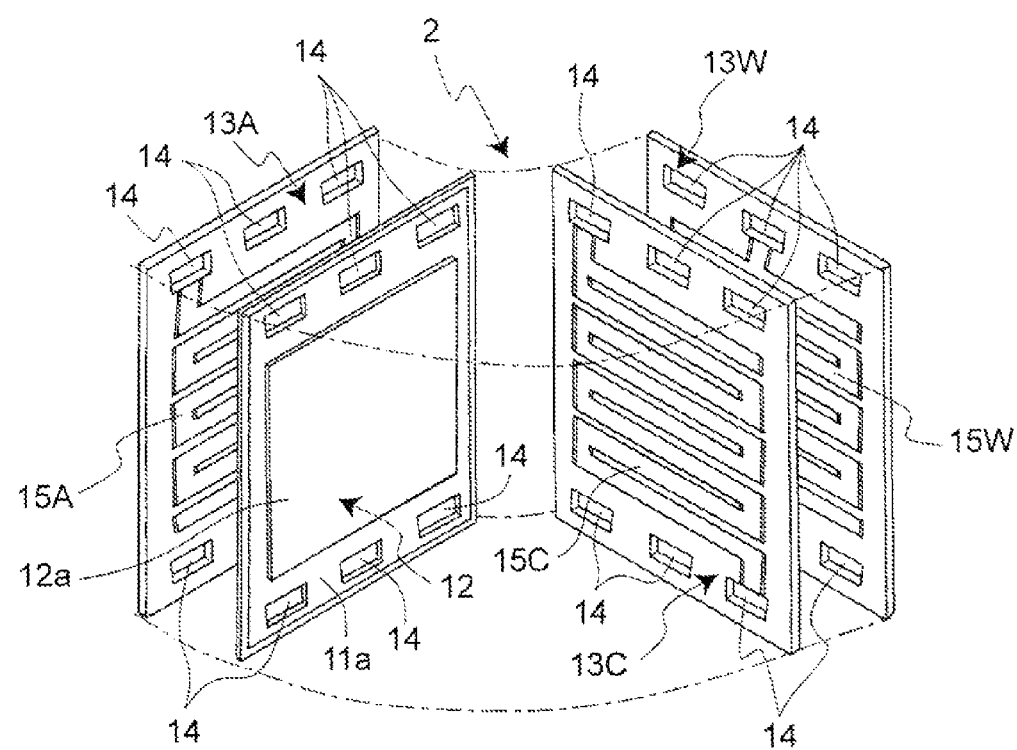
FIG. 2 is an exploded schematic view of a unit cell module (cell) of the fuel cell stack shown in FIG. 1.

FIG. 2 shows an exploded schematic view of the unit cell module (cell) 2. The cell 2 is structured by having an electrolyte membrane electrode assembly (hereinafter referred to as "MEA") 12, which has a gasket 11a as one example of a sealing member at the periphery of each of both the front and rear surfaces thereof, clamped by paired conductive separators 13 (specifically, an anode-side separator 13A and a cathode-side separator 13C); and further, by disposing a coolant separator 13W on the outer side of one of the separators (e.g., the cathode-side separator 13C). At the periphery of the separators 13A and 13C and the MEA 12, paired through holes, i.e., manifold holes 14 are formed, through each of which pairs a fuel gas, an oxidant gas, and coolant flow, respectively. In a state of the cell-stacked product 7 in which a plurality of cells 2 are stacked, these manifold holes 14 communicate with each other as a result of the stacking, to independently form a fuel gas manifold, an oxidant gas manifold, and a coolant manifold, respectively.

A body portion 12a of the MEA 12 is structured with a polymer electrolyte membrane that selectively transports hydrogen ions, and paired electrode layers (i.e., anode and cathode electrode layers) formed on both the internal and external surfaces thereof, at portions inner than the periphery part of the polymer electrolyte membrane. The electrode layers each have a stack structure made up of a gas diffusion layer and a catalyst layer, the catalyst layer being disposed between the gas diffusion layer and the polymer electrolyte membrane.

The anode-side separator 13A and the cathode-side separator 13C are flat plate-like, and their respective surfaces being in contact with the MEA 12, i.e., the inner surfaces, are formed so as to conform to the shape of the MEA 12 and that of the gasket 11a. For the separators 13, as one example, glassy carbon available from Tokai Carbon Co., Ltd. can be used. In connection with the separators 13A, 13C, and 13W, the manifold holes 14 of their respective types penetrate through the separators 13A, 13C, and 13W in the thickness direction. Further, at the inner surfaces of the separators 13A and 13C, a fuel gas flow channel groove 15A and an oxidant gas flow channel groove 15C are formed, respectively. At the inner surface (the surface on the cathode-side separator 13C side) of the separator 13W, a coolant flow channel groove 15W is formed. The manifold holes 14 of their respective types and the respective flow channel grooves 15 are formed by cutting process or molding process.

The gasket 11a disposed at each of the front surface and the rear surface of the MEA 12 is a sealing member structured with an elastic body. By being pressed by the MEA 12 and the separator 13A or 13C, the gasket 11a deforms in accordance with the shape of the inner surface of the separator 13A or 13C, to thereby seal the circumference of the body portion 12a of the MEA 12 and the circumference of the manifold holes 14 of their respective types. At the back surface (outer surface) of the anode-side separator 13A and that of the cathode-side separator 13C, a general sealing member lib such as a squeeze packing made of a heat-resistant material is disposed at the circumference of the manifold holes 14 of their respective types. This sealing member 11b such as a packing prevents leakage of the fuel gas, the oxidant gas, and the coolant from the manifold holes 14 of their respective types, at the conjunction portions between adjacent ones of cells 2.

The current collecting plate 3 is disposed at each of both the outer side of the cell-stacked product 7. The current collecting plate 3 is structured employing, as one example, a gold-plated copper plate, so as to be capable of efficiently collecting the generated electric power. It is to be noted that, as the current collecting plate 3, a metal material exhibiting excellent electrical conductivity, such as iron, stainless steel, aluminum, or the like may be used. On the outer sides of the current collecting plates 3, end plates 4A and 4B employing an electrically insulating material for electrical insulation are disposed, respectively, so that the end plates 4A and 4B also serve as insulators. Here, as one example, the end plates 4A and 4B and the pipes 5 are prepared by injection molding employing polyphenylene sulfide resin. The pipes 5 which are separately prepared from the front end plate 4A are pressed against the manifolds of the cell-stacked product 7 via the gasket 5a having manifold-use through holes to establish communication, and fastened by the band 8A and 8B having the front end plate 4A interposed therebetween. On the other hand, on the inner side of the rear end plate 4B, a multitude of internal springs 6 functioning as one example of an elastic body that applies a load to the cell-stacked product 7 are evenly disposed, such that a load of about 10 kN is applied to the cell-stacked product 7 when fastened by the bands 8A and 8B. When the fuel cell stack 1 is assembled, the cell-stacked product 7 is fastened by the two bands 8A and 8B and pins 10 as one example of two pin members, having the end plates 4A and 4B interposed therebetween.

The bands 8A and 8B are each structured with a metal belt-like member having a substantially U-shaped planar shape, so as to be capable of surrounding and fastening the fastening target members, including the end plates 4A and 4B and the like, from the outer side. The edge portions 8a and 8b at both the end portions in the longitudinal direction of the bands 8A and 8B each being a belt-like member are provided with a plurality of coupling portions 9 at certain intervals along their vertical direction. The coupling portions 9 are each structured by fixing both the end portions of a metal belt-like member narrower than the bands 8A and 8B to the edge portions 8a and 8b, through welding or the like, so as to form a through hole 9a opening through in the vertical direction. Into each through hole 9a, the pin 10 having an identical diameter in the lengthwise direction and functioning as one example of pin members can be inserted.

Between the edge portions 8a and 8b of both the end portions of the bands 8A and 8B, respectively, the disposition positions of the coupling portions 9 are different, while the bands. 8A and 88 have the identical structure. Hence, between both the edge portions 8a and 8b of the end portions of the end portions of the opposing paired bands 8A and 8B which are approaching near to each other when fastening is carried out, respectively, the disposition positions of the coupling portions 9 are identical to each other. Further, between the edge portions 8a and 8b of both the end portions of the paired bands 8A and 8B which are disposed diagonally opposite to each other without approaching near when fastening is carried out, respectively, the disposition positions of the coupling portions 9 alternate. With such a structure, the bands 8A and 8B can be manufactured as of the identical structure. This makes it possible to greatly reduce the manufacturing cost, and makes it easier to balance the fastening load.

In a state where, to the entire fastening target members (fastened members) such as the current collecting plates 3 and the cell-stacked product 7, the paired bands 8A and 8B are combined in their fastened direction from the outer side so as to be fastened up by the paired end plates 4A and 4B structured as described above, in connection with the combined edge portions 8a and 8b of the paired bands 8A and 8B, respectively, into any space 19 between adjacent ones of the coupling portions 9 and 9 or any space 19 where no coupling portion 9 is disposed (hereinafter simply referred to as the "coupling portion insert space 19 without the coupling portion 9" or "coupling portion insert space 19") at the edge portion 8a of the end portion of one of the bands 8A and 8B, each coupling portion 9 of the edge portion 8b of the other one of the bands 8A and 8B enters. In such a state fastened up by the bands 8A and 8B, the coupling portions 9 of the one edge portion 8a and the coupling portions 9 of the other edge portion 8b are positioned such that their respective through holes 9a can establish communication with one another. Thus, by inserting one pin 10 in the longitudinal direction into the coupling portions 9, to couple the one end portions and the other end portions of the bands 8A and 8B to each other, it becomes possible to structure the fuel cell stack 1 in a state where the fastening target members are fastened under a prescribed fastening load, e.g., a fastening load of 10 kN.

In the present embodiment, as one example, thirty pieces of the cells 2 are stacked to structure the cell-stacked product 7, and the fastening target members including the thirty cells 2 are fastened by the two bands 8A and 8B and the two pins 10.

In the following, a description will be given of several working examples of the present embodiment which are more specific.

First Working Example

Figure 3A:
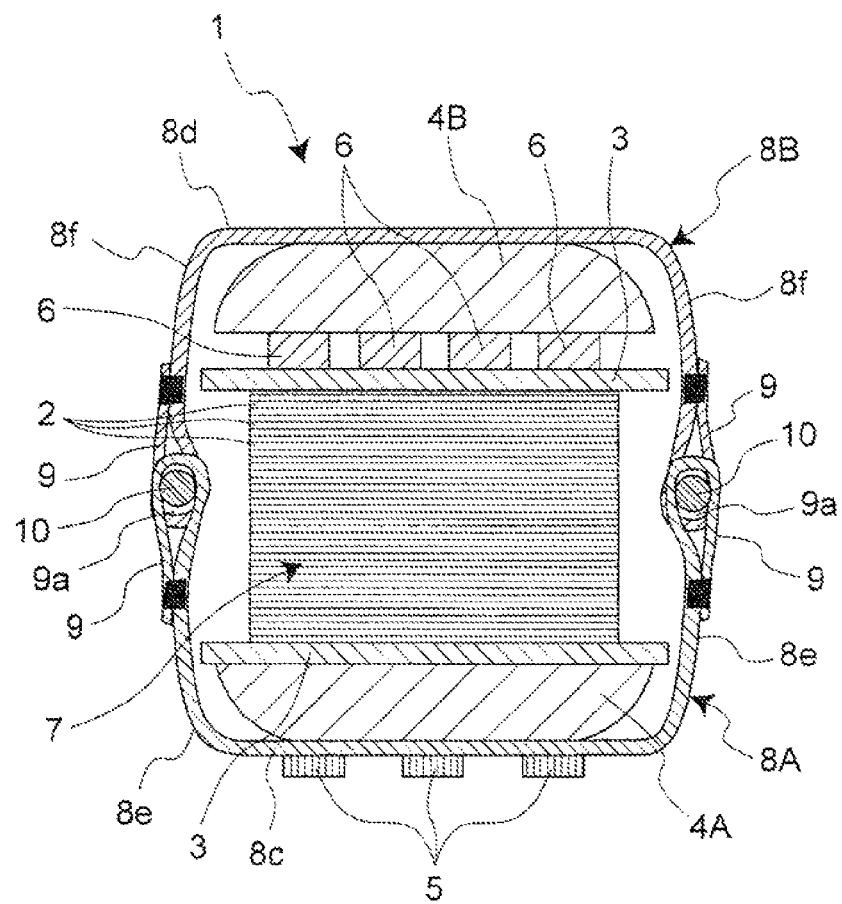
FIG. 3A is a cross-sectional plan view of a fuel cell stack according to a first working example of the embodiment.
Figure 3B:
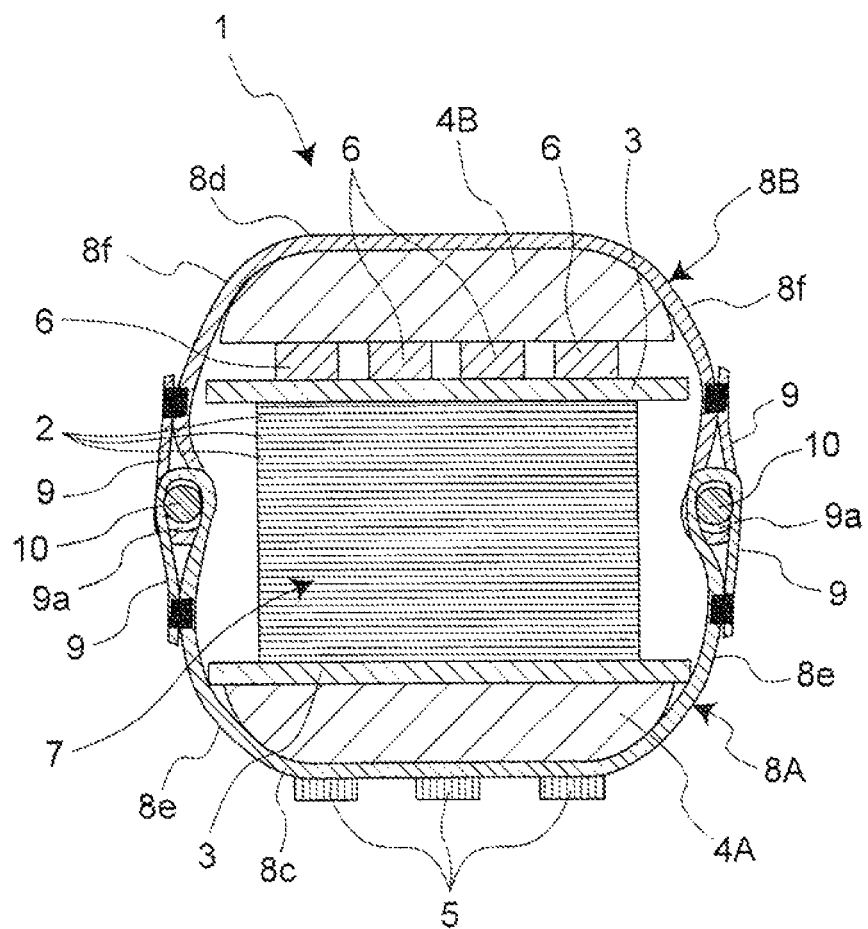
FIG. 3B is a cross-sectional plan view of a fuel cell stack according to a variation example of the first working example of the embodiment.

FIGS. 3A and 3B show cross-sectional plan views of fuel cell stacks 1 according to a first working example of the present embodiment and according to a variation example thereof, respectively. Current collecting plates 3 are disposed at the top and bottom surfaces of a cell-stacked product 7, respectively. Pipes 5 are disposed near one of the current collecting plates 3 on the bottom side of the cell-stacked product 7 and held by an end plate 4A. On the other one of the current collecting plates 3 on the top side, a multitude of internal springs 6 are disposed. Thus, such components are sandwiched between the top and bottom end plates 4A and 4B. The entire fastening target members are covered by two bands 8A and 8B which have band body portions 8c and 8d, respectively, which are as wide as the cell 2. As one example, fastening is established by the bands 8A and 8B being coupled by two pins 10. When the assembly is completed with the bands 8A and 8B and the pins 10, a multitude of internal springs 6 on the current collecting plate 3 are compressed between the cell-stacked product 7 and the end plate 4B, whereby, as one example, a load of, e.g., about 10 kN, is applied to the cell-stacked product 7. Here, in order for the load to evenly be applied within the plane of each of the cells 2 when fastened by the bands 8A and 8B, the end plates 4A and 4B are each molded with polyphenylene sulfide resin into: a flat portion 4a on the cell 2 side; and a flat portion 4b on the bands 8A or 8B sides, the flat portion 4b being brought into close contact with the band body portions 8c or 8d of the bands 8A or 8B at the center of the end plates 4A and 4B, and an arc-shaped curved surface portion 4c at each side of the flat portion 4b, the arc-shaped curved surface portion 4c being brought into contact with side plate portions 8e or 8f, which will be described later, of the bands 8A or 8B at the portions on both sides of the center of the end plates 4A and 4B. The curved surface portions 4c on both the sides of the flat portion 4b are identical in curvature. The flat portion 4a and the flat portion 4b are disposed in parallel to each other, such that even fastening force is applied to the cell-stacked product 7 from the bands 8A and 8B via the end plates 4A and 4B. In particular, the portions corresponding to the corners of both the end plates 4A and 4B are formed as the curved surface portions 4c, and, as will be described later, are arranged such that the side plate portions 8e and 8f of the bands 8A and 8B, respectively, are allowed to conform to the curved surface portions 4c. Such structure can surely resolve the issue associated with an end plate in which, instead of such a curved surface portion, an angle is formed by two planes intersecting each other, the presence of which hinders application of an even fastening force from the bands to the cell-stacked product 7. In the first working example, polyphenylene sulfide resin as a thermoplastic resin is used as the material of the end plates 4A and 4B which also function as insulators. However, phenolic resin being a thermosetting resin, or a combination of a metal plate such as aluminum and an insulating resin plate may be employed as the end plates 4A and 4B. Further, though in the first working example, the springs 6 are disposed on one of the current collecting plates 3, the springs 6 may be disposed on both the current collecting plates 3.

Figure 4A:
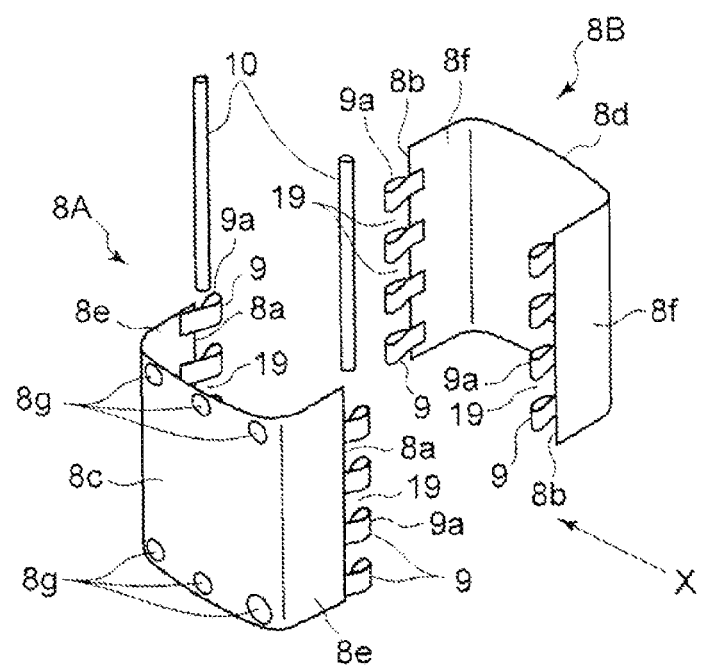
FIG. 4A is an exploded perspective view showing bands and pins in a case where, in the first working example, coupling portions for the bands are provided at two places, and the bands and the pins are used two pieces each.

FIG. 4A shows an exploded perspective view of the bands 8A and 8B and the pins 10. The bands 8A and 8B are formed to be as wide as the cell 2 and to cover the entire outer side of the end plates 4A and 4B, and both the side surfaces and the like of the current collecting plates 3, the cell-stacked product 7. Hence, it is structured such that, when fastening is carried out, the intermediate portion of the fastening target member (the intermediate portion of the cell-stacked product 7 in between the end plates 4A and 4B), that is, at the two places, i.e., at the center portion of each of both the side surfaces of the cell-stacked product 7, the coupling portions 9 of one band 8A and the coupling portions 9 of the other band 8B are alternately combined in line, to be coupled by one pin 10. More specifically, the bands 8A and 8B are structured with: the plate-like band body portions 8c and 8d capable of being brought into close contact with the outer surface of the flat portions 4b of the end plates 4A and 4B, respectively, and functioning as base plates formed in the stacked direction of the cell-stacked product 7, among the outer surfaces of the end plates 4A and 4B; the side plate portions 8e and 8f integrally coupled to the right and left edges of the plate-like band body portions 8c and 8d so as to form end portions of the bands 8A and 8B, respectively, and whose coupling sections with respect to the band body portions 8c and 8d are curved, respectively; and the coupling portions 9 fixed to the edge portions 8a and 8b of the side plate portions 8e and 8f, respectively. Each of the side plate portions 8e and 8f function as side plates that continuously extend from the band body portions 8c and 8d, respectively, to both the sideways of the stacked product. Hence, the bands 3A and 8B structure belt-like members with the one side plate portions 8e and 8f, the band body portions 8c and 8d, and the other side plate portions 8e and 8f, respectively. The plate-like band body portions 8c and 8d is structured to be as wide as each of the end plates 4A and 4B of the cell 2. In particular, in the variation example of the first working example shown in FIG. 3B, it is disposed such that: the band body portions 8c and 8d of the bands 8A and 8B are brought into close contact with the flat portions 4b of the end plates 4A and 4B, respectively; and the side plate portions 8e and 8f of the bands 8A and 8B are brought into close contact with the curved surface portions 4c on both the sides of the end plates 4A and 4B, respectively, so as to facilitate application of an even fastening force from the bands 8A and 8B to the cell-stacked product 7 via the end plates 4A and 4B, respectively. Further, in FIGS. 1 and 4A, at the left side edge portion 8a of the one band (front band) 8A, one coupling portion 9 is fixed to the top end, and successively, three coupling portions 9 are fixed at certain intervals. Thus, four coupling portions 9 in total are fixed. Further, at the right side edge portion 8a of the one band (front band) 8A, four coupling portions 9 are fixed, as being downwardly displaced relative to the four coupling portions 9 of the left side edge portion 8a, each by a dimension at least greater than the width of one coupling portion 9. That is, at the right side edge portion 8a, one coupling portion 9 is fixed to the bottom end, and successively, three coupling portions 9 are fixed above at certain intervals. At the right side edge, portion 8b of the other band (rear band) 8B, four coupling portions 9 are fixed at the positions identical to those at the right side edge portion 8a of the one band (front band) BA. At the left side edge portion 8b of the other band (rear band) 8B, four coupling portions 9 are fixed at the positions identical to those at the left side edge portion 8a of the one band (front band) 8A. Hence, in a state where the one band (front band) 8A and the other band (rear band) 8B are fastened with a prescribed fastening load, simultaneously with the four coupling portions 9 at the left side edge portion 8a of the one band (front band) 8A entering the coupling portion insert spaces 19 at the right side edge portion 8b of the other band (rear band) 8B where the four coupling portions 9 are absent, the four coupling portions 9 at the left side edge portion 8a of the one band (front band) 8A enter the coupling portion insert spaces 19 among the four coupling portions 9 at the right side edge portion 8b of the other band (rear band) 8B. Thus, communication can be established among a total of eight through holes 9a formed by the coupling portions 9 on each side.

It is to be noted that, to the band 8A which is on the side where the pipes 5 are disposed, as one example, holes 8g for allowing the pipes 5 to pass therethrough are formed through machine process or molding process. As one example, the coupling portions 9 of the bands 8A and 8B are formed by spot welding, such that round-rod like pins 10 can be inserted into the coupling portions 9 while coupling the bands 8A and 8B with each other.

It is to be noted that, so long as the coupling portions 9 can exert the fastening load substantially evenly to the edge portions 8a and 8b of the bands 8A and 8B, their disposition, numbers, shape, or structure is not limited to those described in the foregoing.

In the first working example, though coupling are established at two places with the two bands 8A and 83 and the two pins 10, such coupling portions 9 between the bands 8A and 8B may be provided at one place, or at three or more places.

Figure 4B:
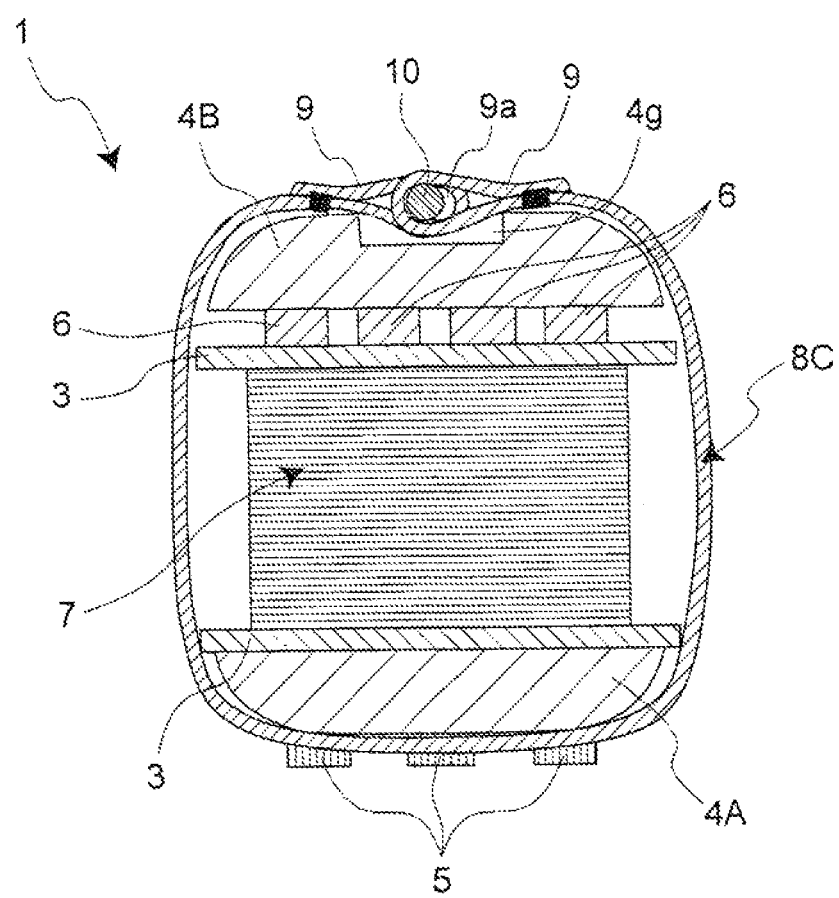
FIG. 4B is a cross-sectional view of a stack in a case where a coupling portion for the bands is provided at one place, and the band and the pin are used one piece each.

For example, FIG. 4B shows a cross-sectional view of the stack in which the coupling portion of the bands is provided at one place, and the band and the pin are used one each. Here, from the center portion of the one end plate 4B, through the one side surface of the stacked product 7, the other end plate 4A, the other side surface of the stacked product 7, to the center portion of the one end plate 4B is wrapped around by one turn by one band 8C. At the center portion of the one end plate 4B, the coupling portions 9 at the both the edge portions of the band 8C are combined at one place. Into the through holes 9a formed by the combination of the coupling portions 9, one piece of the pin 10 is inserted, so as to attain fastening. In FIG. 4B, a concave portion 4g is provided at the center portion of the one end plate 4B, and the one pin 10 is inserted into the through holes 9a of the coupling portions 9 at the concave portion 4g.

Figure 4C:
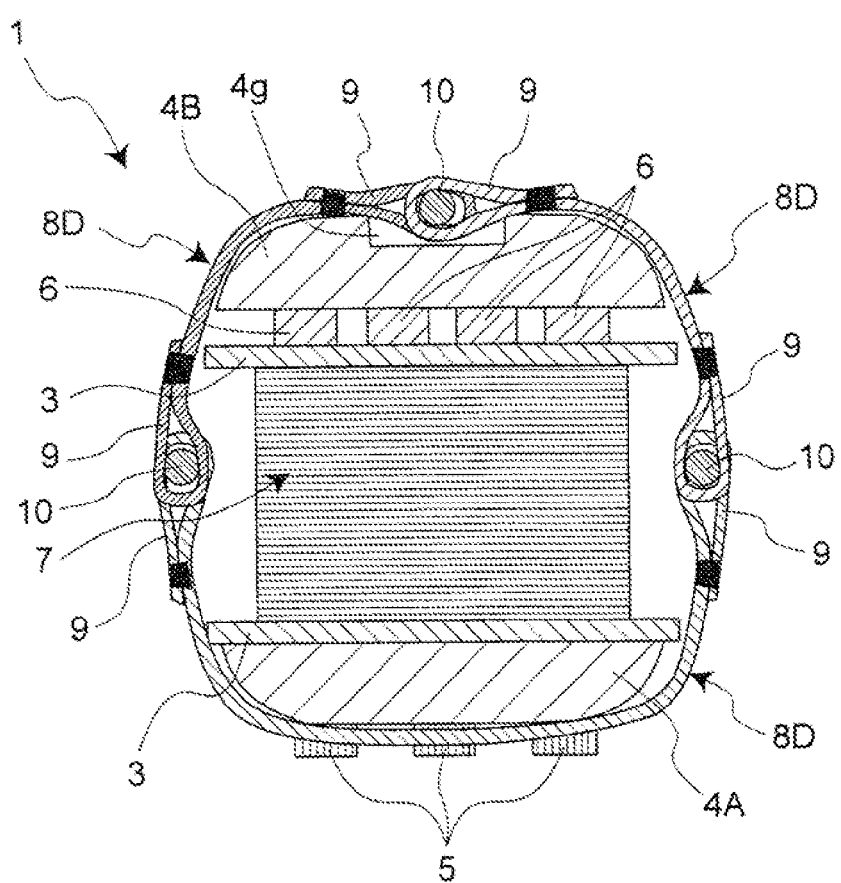
FIG. 4C is a cross-sectional view of a stack in a case where coupling portions for the bands is provided at three places, and the bands and the pins are used three pieces each.

Further, as another example, FIG. 4C shows a cross-sectional view of the stack in which coupling sections by the coupling portions 9 are provided at three places, and the bands 8D and the pins 10 are used three pieces each. In FIG. 4C, a plurality of coupling portions 9 at the left edge 8a of each of the bands 8D and a plurality of coupling portions 9 or one coupling portion 9 at the right edge 8a of the band 8D adjacent to the above band 8D are combined, such that the one pin 10 can be passed through each through hole 9a of the coupling portions 9, to thereby attain fixation. In FIG. 4C also, the concave portion 4g is provided at the center portion of the one end plate 4B, and the one pin 10 is inserted into the through holes 9a of the coupling portions 9 of the concave portion 4g.

Figure 5:
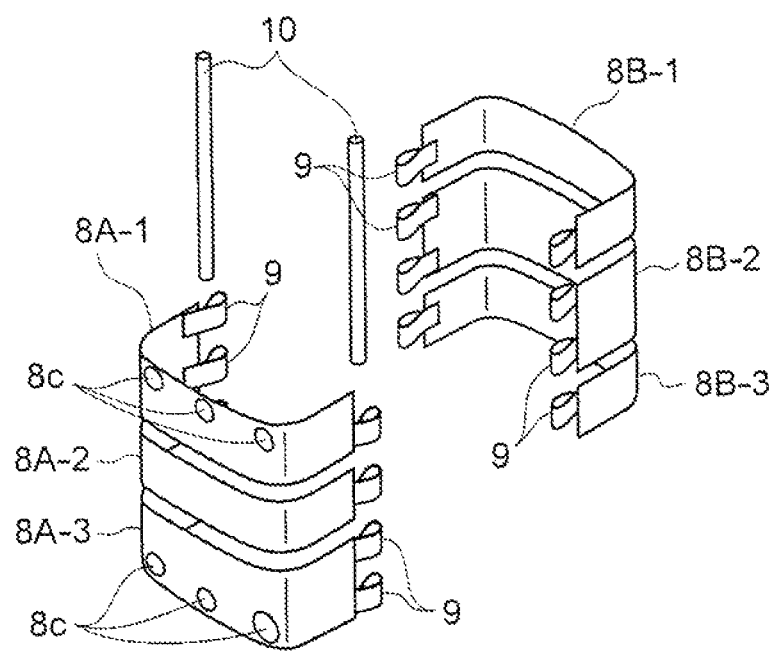
FIG. 5 is an exploded perspective view of the bands and the pins in a case where the bands are used three pieces in the planar direction.

In the first working example, though fastening is attained by the two bands 8A and 8B, as shown in FIG. 5 which is an exploded perspective view of the bands 8A and 8B and the pins 10, the bands 8A and 8B one each may be divided in the in-plane direction (in FIG. 5, the top to bottom direction), such that the bands 8A and 8B each can be used as a plurality of (e.g., three) bands 8A-1, 8A-2, 8A-3, 8B-1, 8B-2, and 8B-3.

It is necessary for the material of the bands 8A (8A-1, 8A-2, 8A-3), 8B (8B-1, 8B-2, 8B-3), 8C, and 8D to posses at least the rigidity enough to exert the fastening force by the fastening load. Preferably, the bands may be structured with metals such as stainless steel, hard rubber, or synthetic resin. Further, similarly, it is necessary for the pins 10 to posses at least the rigidity enough to exert the fastening load. Preferably, the pins may be structured with any material whose strength is relatively high, such as metals or a fiber reinforced resin material. In the first working example, as one example, stainless steel is used for the bands 8A and 8B, and chrome molybdenum steel material SCM435 is used for the pins 10.

Next, a description will be given of an assembly method of the fuel cell stack 1 according to the first working example. As one example, the description will be given of a case where two bands 8A and 8B are used in the structure.

On the one band 8A, the front end plate 4A, the pipes 5, the current collecting plate 3, the cell-stacked product 7 structured with a plurality of cells 2, the current collecting plate 3, the rear end plate 4B, and the other band 8B are stacked in this order, thereby the fastening target members are placed. Thereafter, as one example, a fastening load of, e.g., 10 kN, is applied to the entire fastening target members. Then, the coupling portions 9 of the one band 8A and the coupling portions 9 of the other band 8B are alternately combined so as to be disposed in line on each side. In this state, the fastened state of the fastening target members attained by the paired bands 8A and 8B is retained by a jig. As a result, in a state being fastened by the fastening force of the prescribed fastening load, simultaneously with the four coupling portions 9 at the right side edge portion 8a of the one band (front band) 8A entering the coupling portion insert spaces 19 at the left side edge portion 8b of the other band (rear band) 8B where the four coupling portions 9 are absent, the four coupling portions 9 at the right side edge portion 8a of the one band (front band) 8A enter the coupling portion insert spaces 19 among the four coupling portions 9 at the left side edge portion 8b of the other band (rear band) 8B. Thus, a state where communication is established among a total of eight through holes 9a formed by the coupling portions 9 on each side.

Thereafter, the pin 10 is inserted into a total of eight coupling portions 9 on each side.

Next, when the fastened state of the fastening target members established by the paired bands 8A and 8B through the use of the jig is released by releasing the jig, the elastic recovery force of the sealing members and the like of the cell-stacked product 7 causes the paired bands 8A and 8B to shift in directions away from each other. Then, the four coupling portions 9 of the band 8A and the four coupling portions 9 of the band 8B pull each other in opposite directions from each other, with respect to the pin 10 and in the directions perpendicular to the longitudinal direction of the pin 10. Thus, the pins 10 and a total of eight coupling portions 9 for each of the paired bands 8A and 8B are fixed, and each pin 10 is retained so as to avoid its coming off from the total of eight coupling portions 9, to complete the fastening assembly.

Here, since the thickness of each of the separators 13A, 13C, and 13W and the MEA 12 varies, the thickness of the cell-stacked product 7 also varies. The dimension of the bands 8A and 8B is determined within the tolerance. When the cell-stacked product 7 is excessively thicker or thinner than the prescribed dimension, the fastening load varies. As a result, the fastening pressure on the MEA 12 also varies, which may invite a difference in the power generation performance. Accordingly, in order to prevent such an event, as described above, the first working example employs the manufacturing method of the stack which includes the band structure capable of applying an appropriate load addressing variations in dimension of the fuel cell stack 1, based on the use of the coupling portions 9 and the pins 10.

Next, a description will be given of a loading method of an appropriate load.

In the first working example, the pins 10 coupling the bands 8A and 8B are prepared in a plurality of diameters. Use of the pins 10 of an appropriate diameter and in the number in accordance with the thickness of the cell-stacked product 7 makes it possible to apply an appropriate load to any cell-stacked product 7.

First, a description will be given of adjustment of the fastening load in a case where two pins 10 differing from each other in diameter are used.

Figure 6:
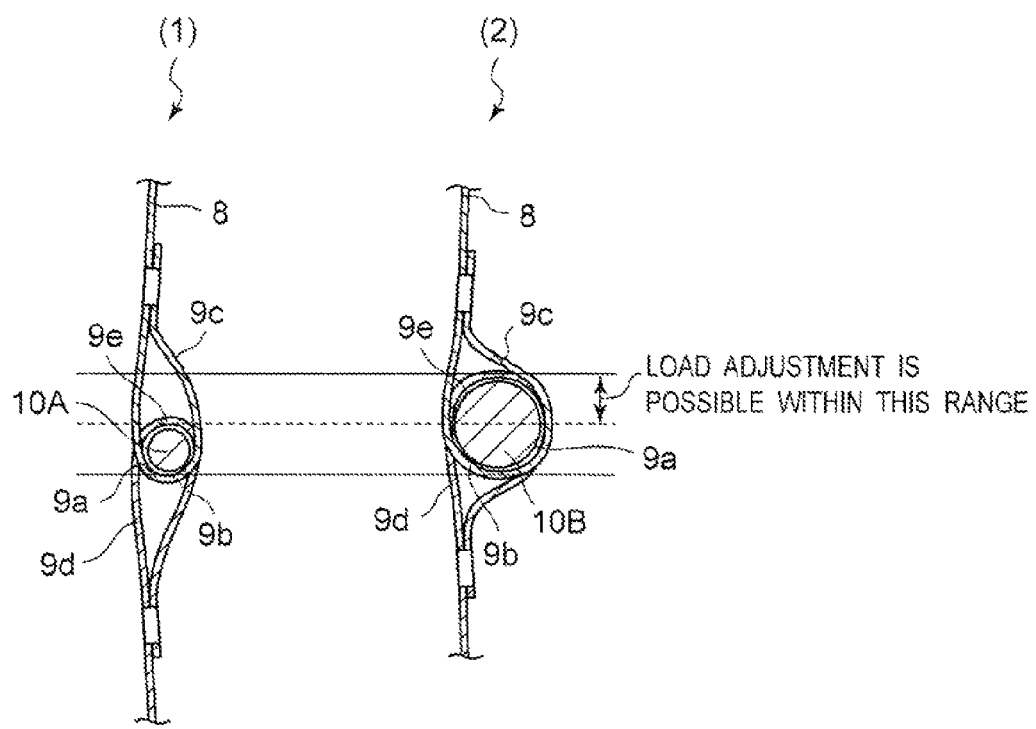
FIG. 6 is an enlarged cross-sectional plan view showing two types of band coupling portions according to the first working example (in which (1) in FIG. 6 shows a case where, as one example, the diameter of the pin is φ5 mm, whereas (2) in FIG. 6 shows a case where, as one example, the diameter of the pin is φ10 mm)

FIG. 6 is an enlarged cross-sectional view of the coupling portions 9 of the band 8 (the bands 8A, 8B, 8C, 8D and the like are collectively referred to as the "band 8") according to the first working example. (1) in FIG. 6 shows the coupling portions 9 in which a pin 10A of, e.g., φ5 mm is used. (2) in FIG. 6 shows the coupling portions 9 in which a pin 10B of, e.g., φ10 mm is used.

Here, (1) in FIG. 6 shows that the pin 10A having a diameter of φ5 mm is fitted in the through hole 9a of a coupling portion 9c on the top side, up to a range of 5 mm upward from the bottom end position 9b of the coupling portion 9c on the top side; and the identical pin 10A having a diameter of φ5 mm is fitted in the through hole 9a of a coupling portion 9d on the bottom side, up to a range of 5 mm downward from the top end position 9e of the coupling portion 9d on the bottom side. Hence, in (1) in FIG. 6, the overlapping dimension between the through hole 9a of the coupling portion 9c on the top side and the through hole 9a of the coupling portion 9d on the bottom side is about 5 mm in the top to bottom direction (i.e., in the direction in which the fastening force by the band 8 acts).

In contrast, (2) in FIG. 6 shows that the pin 10B having a diameter of φ10 mm is fitted in the through hole 9a of the coupling portion 9c on the top side, up to a range of 10 mm upward from the bottom end position 9b of the coupling portion 9c on the top side; and the identical pin 10B having a diameter of φ10 mm is fitted in the through hole 9a of the coupling portion 9d on the bottom side, up to a range of 10 mm downward from the top end position 9e of the coupling portion 9d on the bottom side. Hence, in (2) in FIG. 6, the overlapping dimension between the through hole 9a of the coupling portion 9c on the top side and the through hole 9a of coupling portion 9d on the bottom side is about 10 mm in the top to bottom direction (i.e., in the direction in which the fastening force by the band 8 acts).

Thus, in contrast to the case shown in (1) in FIG. 6 in which the overlapping dimension is about 5 mm in the direction in which the fastening force by the band 8 acts, the case shown in (2) in FIG. 6 provides an increase in the overlapping dimension up to about 10 mm in the direction in which the fastening force by the band 8 acts, whereby the fastening load can greatly be increased. Conversely, changing the state shown in (2) in FIG. 6 to the state shown in (1) in FIG. 6, it becomes possible to reduce the overlapping dimension from about 10 mm to about 5 mm in the direction in which the fastening force by the band 8 acts, whereby the fastening load can greatly be reduced. Thus, the fastening load can be adjusted just by inserting or removing the pin 10 into the through hole 9 of the coupling portions 9.

It is to be noted that, whether or not the fastening load is appropriate can be determined based on, for example, the extent of compression of the inner side springs 6.

In the first working example, the pins 10 coupling the bands 8A and 8B are prepared by a plurality of diameters. Use of the pins 10 of an appropriate diameter and in the number in accordance with the thickness of the cell-stacked product 7 makes it possible to apply an appropriate load to any cell-stacked product 7.

In the foregoing description, for the sake of simplicity, adjustment of the fastening load in the case where two pins 10 differing from each other in diameter are used has been described. However, in the practical assembly method, for example, approximately three types, i.e., large, medium, and small may be prepared as the types of diameter of the pins 10. For example, the pin 10A having a diameter of φ5 mm, the pin 10B having a diameter of φ10 mm, and the pin 10 having a diameter of φ15 mm are prepared. Then, first, the medium sized pin 10B having a diameter of φ10 mm out of the three types of pins 10 is inserted into the through holes 9a of the coupling portions 9, to determine whether or not the fastening load is appropriate. When the fastening load is insufficient, the pin 10B having a diameter of φ10 mm is replaced by the pin 10 having a diameter of φ15 mm. On the other hand, when the fastening load is excessive, the pin 10B having a diameter of φ10 mm is replaced by the pin 10A having a diameter of φ5 mm.

In this manner, by changing the diameter of the pins 10, it becomes possible to address thickness variations of, e.g., 5 to 15 mm. In the first working example, on the fastening load basis, the load adjustment at the maximum of about 1 kN can be achieved. As to the pins 10, it is also possible to choose the pins 10 of different diameters between the coupling places for the coupling portions 9 of the bands 8A and 8B. For example, in a case where there are two coupling places for the coupling portions 9, using a round-rod like pin 10 having a diameter of φ5 mm for one coupling place, and using a round-rod like pin 10 having a diameter of φ10 mm for the other coupling place, to achieve coupling, it becomes possible to address thickness variations of 2.5 mm of the cell-stacked product 7, and to apply an appropriate load.

Further, in the first working example, as one example, round rods of a plurality of types of diameters are prepared as the pins 10. The round rod is, for example, as shown in FIG. 7A, a cylindrical column whose opposite ends 10a are planes.

However, not being limited thereto, elaboration on the shape of the tip portion (at least one of the tip portions) of each pin 10 can improve insertability into the coupling portions 9 of the bands. For example, FIGS. 7B to 7D show application examples of the tip portions of each pin 10. First, as one example, in FIG. 7B, the tips of the pin 10 are each formed into a hemispherical shape, thereby achieving a reduction in friction of the pin 10 when being inserted, relative to the through holes 9a of the coupling portions 9 of the bands 8A and 8B. Similarly, as another example, as shown in FIG. 7C, the tips of the pin 10 are each formed into a conical shape like a pencil, thereby achieving a reduction in friction of the pin 10 when being inserted, relative to the through holes 9a of the coupling portions 9 of the bands 8A and 8B. Still further, as still another example, as shown in FIG. 7D, the tip may be formed into a conical shape whose diameter is even smaller than the one shown in FIG. 7C (i.e., narrow), to thereby achieve a further reduction in friction of the pin 10 when being inserted, relative to the through holes 9a of the coupling portions 9 of the bands 8A and 8B.

Figure 7A:
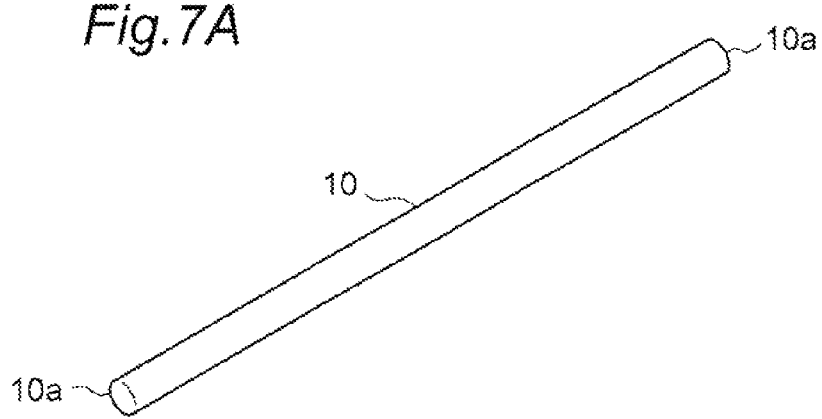
FIG. 7A is a schematic view of the pin according to the first working example.
Figure 7B:
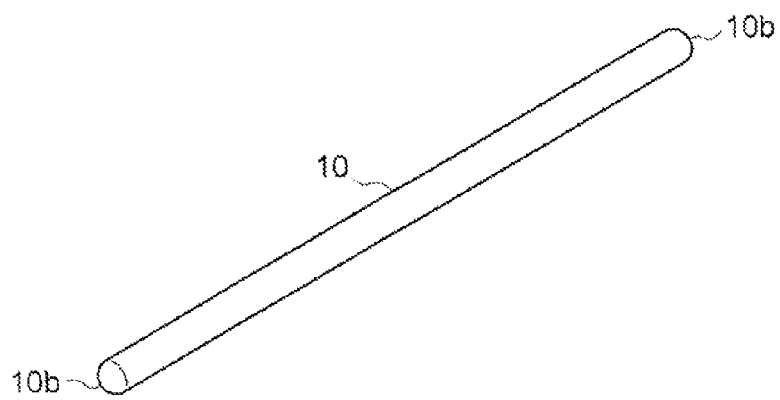
FIG. 7B is a schematic view of an application example of the pin according to the first working example.
Figure 7C:
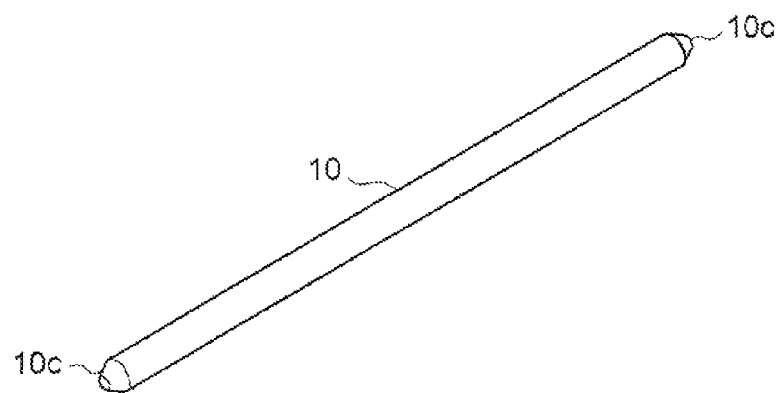
FIG. 7C is a schematic view of an application example of the pin according to the first working example.
Figure 7D:
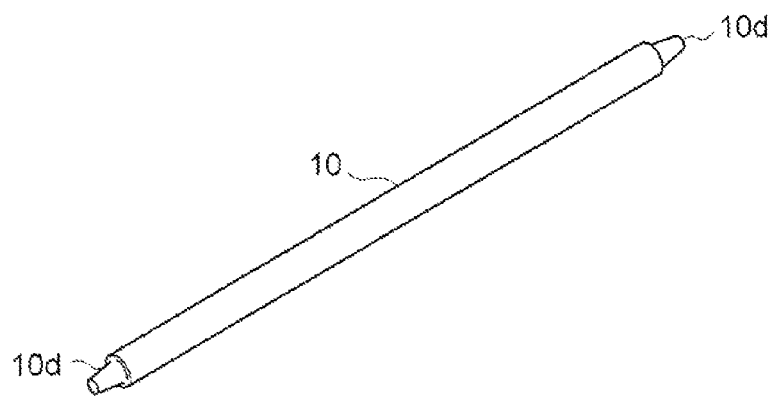
FIG. 7D is a schematic view of an application example of the pin according to the first working example.

Employing such manners, the insertability of each pin 10 relative to the through holes 9a of the coupling portions 9 can further be improved as compared to the round rod shown in FIG. 7A.

Being different from the conventional load adjustment mechanism in which bolts are used for the band-fastened fuel cell stack, with the manufacturing method of the stack which includes a load-adjustable structure through the use of the bands 8A and 8B and the pins 10 according to the first working example, it is unnecessary to prepare any separate member such as a spacer for adjusting the fastening load. Instead, for example, preparation of a plurality of types of the pins 10 differing from one another in diameter will suffice. Hence, the fastening target members (the front end plate 4A, the current collecting plate 3, the cell-stacked product 7 structured with a plurality of cells 2, the current collecting plate 3, and the rear end plate 4B) can dispense with the conventional fastening bolt-use through hole. Therefore, when the size is kept intact, the effective area of the fastening target members as a whole can be increased. On the other hand, when the effective area is kept intact, miniaturization of the fastening target members can be achieved. As a result, a space-saving and compact fuel cell stack can be implemented. Additionally, it becomes possible to provide an efficient stack which can be fastened with an appropriate load. Further, the stack according to the first working example employing the bands 8A and 8B and the pins 10 also exhibits the effect of drastically improved assemblability as compared to the fastening method employing bolts.

Second Example

The cross-section of each pin 10 is not limited to circular as in the first working example, and may be in any shape. In the following, a description will be given of shapes except for circular. For example, (1) in FIG. 8 is a cross-sectional plan view, which is identical to (1) in FIG. 6 for the purpose of comparison, showing a state where the coupling portions 9 are coupled using the pin 10A having a circular cross-sectional shape according to the first working example.

In contrast, (2) in FIG. 8 shows an enlarged cross-sectional plan view of the coupling portions 9 of the bands 8 and a pin 10E according to the second working example. As the pin 10E used herein, a rod whose cross section taken perpendicularly to its longitudinal direction is oval is used. In the second working example, the pin 10E whose cross section is oval, in which the long axis direction is twice as long as the short axis direction, is used. As to the fastening load, the fastening load with an extra load of, e.g., 0.3 kN, can be applied as compared to the first working example. In the second working example, since the dimension of the short axis direction is shorter than the dimension of the long axis direction in the cross-sectional shape of the pin 10E, the volume of the fuel cell stack 1 will not redundantly increase in the short axis direction. Accordingly, while implementing a compact stack, adjustment of the fastening load can be attained. According to the second working example, similarly to the first working example, absorption of 5 to 15 mm thickness variations can be attained. For example, adjustment of the fastening load up to 1 kN is possible.

Further, as shown in (3) in FIG. 8, as another example of the oval cross-sectional shape of the pin 10E, a pin 10F having a teardrop cross-sectional shape and the like may be used.

Third Example (4) in FIG. 8 shows an enlarged cross-sectional plan view around the coupling portions 9 of the bands 8 according to the third working example of the embodiment. Employing a plurality of pins 10G of the same type for fastening the coupling portions 9 of the bands 8, the fastening load can be adjusted. According to the third working example, when the thickness of the cell-stacked product 7 is thin, the pins 10G can be inserted into one coupling section of the coupling portions 9 and the coupling portions 9. That is, two pins 10G can be inserted into one through hole 9a formed of the coupling portions 9, so as to adjust the fastening load addressing the thickness variations of the cell-stacked product 7 by a length of the diameter of the pin 10G. This is effective in being capable of completing the stack assembly without incurring an increase in the volume of the stack 3 or requiring preparation of the pins 10 differing from one another in diameter and cross-sectional shape. Since it is not necessary to prepare a plurality of types of the pins 10, manufacturing can be carried out with small number of components, and additionally, an improvement in assemblability can be achieved.

Figure 9:
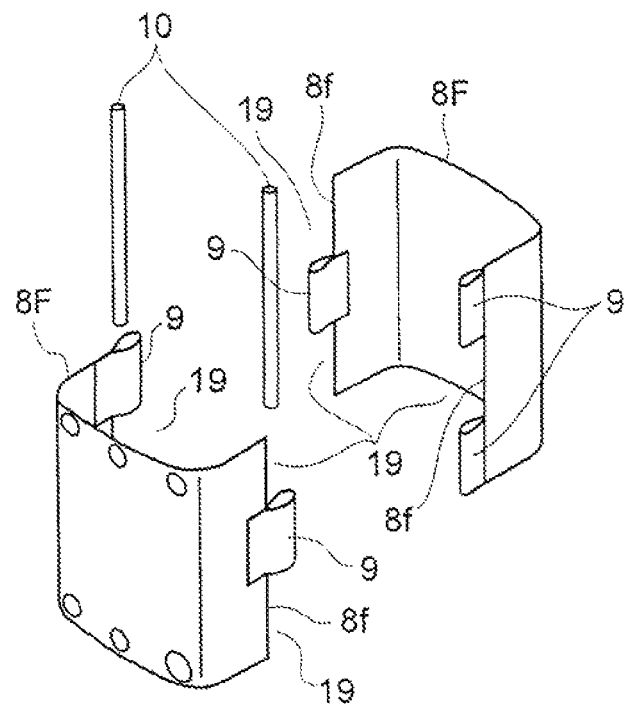
FIG. 9 is a perspective view of the bands and the pins in a variation example of the embodiment.

Further, FIG. 9 shows a perspective view of bands 8F and the pins according to a variation example of the embodiment. According to the first working example, though a plurality of coupling portions 9 are disposed at the edge portions 8a and 8b of both the end portions of the bands 8A and 8B, the present invention is not limited thereto. For example, as shown in FIG. 9, one coupling portion 9 may be disposed at an edge portion 8f of one end of each of the bands 8F, and a plurality of (e.g., two) coupling portions 9 may be disposed at edge portion 8f of the other end.

Figure 10A:
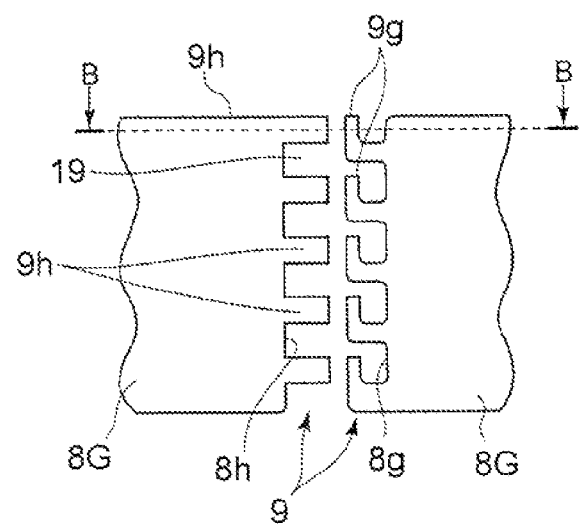
FIG. 10A is a side view of a coupling section of coupling portions of the bands in another variation example of the embodiment.
Figure 10B:
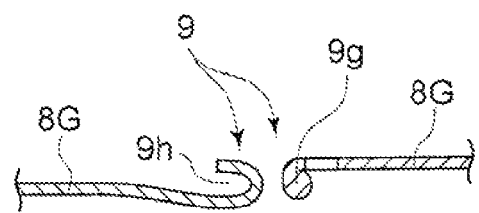
FIG. 10B is a cross-sectional view taken along line B-B in FIG. 10A.

Further, FIGS. 10A and 10B show a side view of the coupling section of the coupling portions 9 of paired bands 8G according to another variation example of the embodiment (in the paired bands 8G, as seen from the same direction as the X-direction in FIG. 4A) and a cross-sectional view taken along line B-B, respectively. In this example, the pin 10 is integrated with the coupling portions 9 at the one end of each of the bands 8G. Specifically, L-shaped projections are formed at an edge portion 8g at one end of each of the bands 8G. Of each L-shaped projection, the portion extending along the longitudinal direction of the edge portion is formed as a round rod portion 9g, so as to function as the one coupling portion 9. At an edge portion 8h of the other end of each of the bands 8G, hook portions 9h each having a J-shaped plane are formed in an alternating manner with the coupling portion insert spaces 19 into which round rod portions 9g being the L-shaped projection can be inserted, so as to function as the other coupling portions 9. Hence, when the paired bands 8G are to be fastened, after a plurality of round rod portions 9g are placed in the coupling portion insert spaces 19, the plurality of round rod portions 9g are shifted along the longitudinal direction (upward, in FIG. 10A). Thus, the plurality of round rod portions 9g can be inserted and engaged in the plurality of hook portions 9h, to establish coupling. In this manner, the necessity of preparing the pins 10 as separate components is eliminated, which achieves a further reduction in the number of components.

Figure 11A:
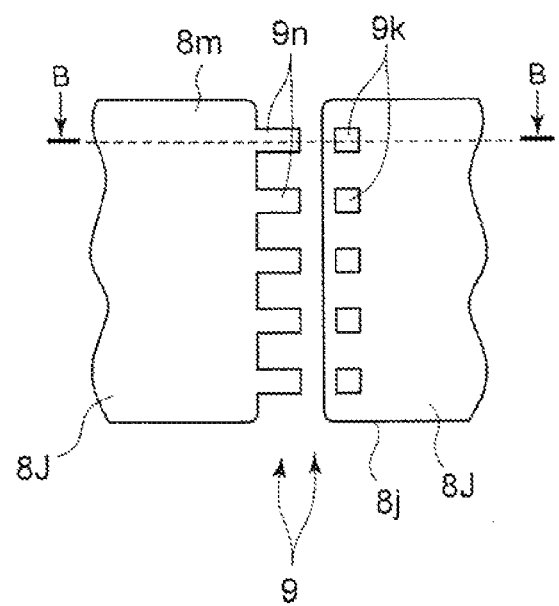
FIG. 11A is a perspective view of a coupling section of coupling portions of the bands in still another variation example of the embodiment.
Figure 11B:
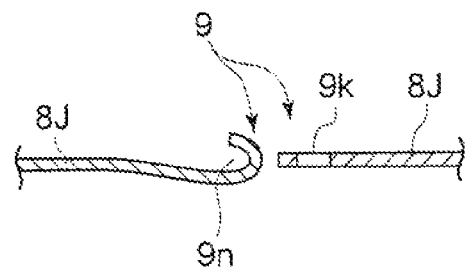
FIG. 11B is a cross-sectional view taken along line B-B in FIG. 11A.
Figure 13:
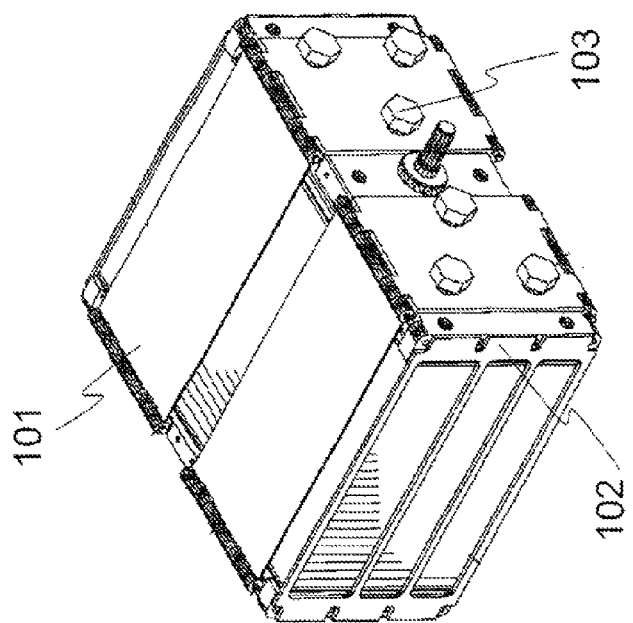
FIG. 13 is a schematic view of a stack showing the fastening structure of Patent Document 2.
Figure 12:
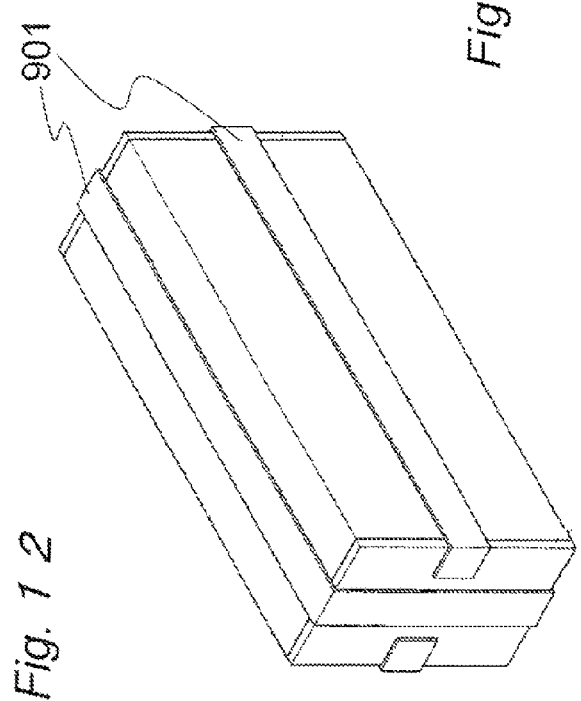
FIG. 12 is a schematic view of a stack showing the fastening structure of Patent Document 1.

Further, FIGS. 11A and 11B show a side view of the coupling section of the coupling portions 9 of paired bands 8J according to still another variation example of the embodiment (in the paired bands 8J, as seen from the same direction as the X-direction in FIG. 4A) and a cross-sectional view taken along line B-B, respectively. In this example also, the pin 10 is integrated with the coupling portions 9 at the one end of each of the bands 8J. Specifically, a plurality of square engaging holes 9k are formed along the edge, around the edge portion of one end portion 8j of each of the bands 83, so as to function as the one coupling portions 9. At the edge portion of the other end portion 8m of each of the bands 8J, hook portions 9n each having a J-shaped plane which can be inserted into the engaging hole 9k and engaged therewith are formed, so as to function as the other coupling portions 9. Hence, when the paired bands 8J are to be fastened, the plurality of hook portions 9n can be inserted into the plurality of engaging holes 9k and engaged therewith, to establish coupling. In this manner, the necessity of preparing the pins 10 as separate components is eliminated, which achieves a further reduction in the number of components.

Further, in FIG. 1 and others, one U-shaped rod, obtained by coupling two pins 10, may be used instead of the two pins 10.

It is to be noted that, any appropriate combination of the various embodiment or working examples described above can achieve their respective effects.

INDUSTRIAL APPLICABILITY

The polymer electrolyte fuel cell stack of the present invention is useful for a fuel cell used for a portable power supply, an electric vehicle-use power supply, a household cogeneration system or the like.

Although the present invention has been fully described in connection with the preferred embodiments thereof with reference to the accompanying drawings, it is to be noted that various changes and modifications are apparent to those skilled in the art. Such changes and modifications are to be understood as included within the scope of the present invention as defined by the appended claims unless they depart therefrom.

The invention claimed is:

1. A polymer electrolyte fuel cell stack, comprising:
    paired fastening members, each fastening member comprising a plate curved in a U-shape;
    a stacked product being obtained by stacking a plurality of unit cell modules in which paired electrode layers respectively formed on opposite surfaces of a polymer electrolyte membrane are clamped between paired separators, the stacked product being stored in the paired fastening members; and
    paired end plates respectively disposed at opposite ends of the stacked product,
    wherein each of the paired fastening members includes
        a base plate that can be brought into close contact with an outer surface of a flat portion of a corresponding one of the end plates and that is formed on the outer surface of the end plate in a stacked direction of the stacked product,
        side plates continuously extending from the base plate along opposite sides of the stacked product,
        a plurality of first coupling portions disposed at an edge portion of each side plate in the stacked direction of the stacked product, and
        a plurality of second coupling portions disposed at the edge portion of each side plate in the stacked direction of the stacked product,
    and wherein, in a state where the fastening members are arranged such that the side plates of one fastening member oppose the side plates of the other fastening member, respectively, and such that, for each pair of opposing side plates, the first and second coupling portions of one of the side plates and the first and second coupling portions of the other of the side plates are engaged with each other such that the first and second coupling portions of the one of the side plates are aligned with the first and second coupling portions of the other of the side plates in an alternating manner, the first and second coupling portions of the one of the side plates and the first and second coupling portions of the other of the side plates are all coupled to each other in the stacked direction of the stacked product by one pin member, so as to couple the paired fastening members to each other.

2. The polymer electrolyte fuel cell stack according to claim 1, wherein, for each pair of opposing side plates, the pin member is passed through at a portion where a through hole of each of the first and second coupling portions of the opposing side plates overlap each other, such that the pin member couples an end portion of the one of the fastening members and an end portion of the other of the fastening members to each other between the fastening members.

3. The polymer electrolyte fuel cell stack according to claim 2, wherein
    each of the first and second coupling portions is structured with a band member having its opposite ends fixed to each other, to form a hole for allowing the pin member to pass therethrough.

4. The polymer electrolyte fuel cell stack according to claim 1, wherein
    the paired fastening members are identical to each other in disposition positions of the first coupling portions, and
    the paired fastening members are identical to each other in disposition positions of the second coupling portions, the disposition positions of the second coupling portions alternating with the disposition positions of the first coupling portions.

5. The polymer electrolyte fuel cell stack according to claim 1, wherein
    a shape of a cross-section of the pin member taken perpendicularly to a longitudinal direction is circular or oval.

6. The polymer electrolyte fuel cell stack according to claim 1, wherein
    per coupling place for the fastening members, a plurality of the pin members are used.

7. The polymer electrolyte fuel cell stack according to claim 1, wherein
    one coupling place for the fastening members is provided, and fastening is established using the one pin member.

8. The polymer electrolyte fuel cell stack according to claim 1, wherein
    three coupling places for the fastening members are provided, and fastening is established by using a plurality of pin members including the one pin member wherein, one of the plurality of pin members is in each of the coupling places.

9. The polymer electrolyte fuel cell stack according to claim 2, wherein
    the paired fastening members are identical to each other in disposition positions of the first coupling portions, and
    the paired fastening members are identical to each other in disposition positions of the second coupling portions, the disposition positions of the second coupling portions alternating with the disposition positions of the first coupling portions.

10. The polymer electrolyte fuel cell stack according to claim 3, wherein
    the paired fastening members are identical to each other in disposition positions of the first coupling portions, and
    the paired fastening members are identical to each other in disposition positions of the second coupling portions, the disposition positions of the second coupling portions alternating with the disposition positions of the first coupling portions.

11. The polymer electrolyte fuel cell stack according to claim 2, wherein
    a shape of a cross-section of the pin member taken perpendicularly to a longitudinal direction is circular or oval.

12. The polymer electrolyte fuel cell stack according to claim 3, wherein
    a shape of a cross-section of the pin member taken perpendicularly to a longitudinal direction is circular or oval.

13. The polymer electrolyte fuel cell stack according to claim 2, wherein
    per coupling place for the fastening members, a plurality of the pin members are used.

14. The polymer electrolyte fuel cell stack according to claim 2, wherein
    one coupling place for the fastening members is provided, and fastening is established using the one pin member.

15. The polymer electrolyte fuel cell stack according to claim 2, wherein three coupling places for the fastening members are provided, and fastening is established by using a plurality of pin members including the one pin member wherein, one of the plurality of pin members is in each of the coupling places.

* * * * *